US011305692B2

(12) United States Patent
Matsui et al.

(10) Patent No.: US 11,305,692 B2
(45) Date of Patent: Apr. 19, 2022

(54) DISPLAY SYSTEM

(71) Applicant: Panasonic Intellectual Property Management Co., Ltd., Osaka (JP)

(72) Inventors: Satoshi Matsui, Kyoto (JP); Norikazu Katsuyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/009,449

(22) Filed: Sep. 1, 2020

(65) Prior Publication Data

US 2020/0398752 A1 Dec. 24, 2020

Related U.S. Application Data

(63) Continuation of application No. PCT/JP2019/008119, filed on Mar. 1, 2019.

(30) Foreign Application Priority Data

Mar. 2, 2018 (JP) .............................. JP2018-037913

(51) Int. Cl.
*G09G 5/00* (2006.01)
*B60R 1/00* (2022.01)
(Continued)

(52) U.S. Cl.
CPC .......... *B60R 1/001* (2013.01); *G02B 27/0101* (2013.01); *G02B 27/0179* (2013.01);
(Continued)

(58) Field of Classification Search
CPC ........................ B60K 35/00; G02B 27/0101
See application file for complete search history.

(56) References Cited

U.S. PATENT DOCUMENTS

2010/0066832 A1* 3/2010 Nagahara ............. G02B 7/1822
348/148
2014/0297174 A1* 10/2014 Tomizawa ........... G01C 21/365
701/408
2016/0216521 A1 7/2016 Yachida et al.

FOREIGN PATENT DOCUMENTS

JP 8-285621 11/1996
JP 10-170290 6/1998
(Continued)

OTHER PUBLICATIONS

International Preliminary Report on Patentability dated Sep. 24, 2020 in International (PCT) Patent Application No. PCT/JP2019/008119.

(Continued)

*Primary Examiner* — Nan-Ying Yang
(74) *Attorney, Agent, or Firm* — Wenderoth, Lind & Ponack, L.L.P.

(57) ABSTRACT

The present disclosure provides a display system that includes an information acquisition device, a display processing device, a posture detection device, and a correction processing device. The information acquisition device acquires a position of a moving body and information outside the moving body. The display processing device controls display of an image based on information acquired by the information acquisition device. The posture detection device that detects posture variation of the moving body. The correction processing device that sets a correction amount of a display position of the image based on posture variation of the moving body, outputs the correction amount when the display information acquired from the display processing device indicates that the image is being displayed, and reduces size of the correction amount when the display information indicates that the image is not being displayed.

9 Claims, 17 Drawing Sheets

(51) Int. Cl.
- *G02B 27/01* (2006.01)
- *G06F 3/01* (2006.01)
- *G06K 9/00* (2022.01)

(52) U.S. Cl.
CPC .......... *G06F 3/011* (2013.01); *G06K 9/00362* (2013.01); *B60R 2300/205* (2013.01); *B60R 2300/605* (2013.01); *G02B 2027/014* (2013.01); *G02B 2027/0138* (2013.01); *G02B 2027/0187* (2013.01)

(56) References Cited

FOREIGN PATENT DOCUMENTS

| | | |
|---|---|---|
| JP | 2014-99078 | 5/2014 |
| JP | 2015-80988 | 4/2015 |
| JP | 2015-101311 | 6/2015 |
| JP | 2016-175618 | 10/2016 |
| JP | 2016-222061 | 12/2016 |
| JP | 2017-94882 | 6/2017 |

OTHER PUBLICATIONS

Extended European Search Report dated Mar. 9, 2021 in European Application No. 19761314.4.
International Search Report dated May 28, 2019 in International (PCT) Application No. PCT/JP2019/008119.

\* cited by examiner

DISPLAY SYSTEM

CROSS-REFERENCE TO RELATED APPLICATIONS

This is a continuation application of International Application No. PCT/JP2019/008119, with an international filing date of Mar. 1, 2019, which claims priority of Japanese Patent Application No. 2018-037913 filed on Mar. 2, 2018, the content of which is incorporated herein by reference.

BACKGROUND OF THE INVENTION

1. Technical Field

The present disclosure relates to a display system that controls a display position of an image according to the movement of a moving body.

2. Description of Related Art

JP 2015-101311 A discloses a vehicle information projection system that performs augmented reality (AR) display using a head-up display (HUD) device. The HUD device projects light representing a virtual image on the windshield of a vehicle so that a viewer who is an occupant of the vehicle visually recognizes the virtual image together with an actual view of the outside world of the vehicle. For example, a virtual image representing a guide route of the vehicle is displayed in association with a display target (for example, road) in the actual view. In this manner, the occupant can confirm the guide route while visually recognizing the actual view. The vehicle information projection system of Patent Document 1 includes a vehicle speed sensor and corrects a display position of the virtual image according to acceleration. This restricts generation of position displacement of the virtual image when the vehicle is suddenly decelerated and suddenly accelerated.

SUMMARY

The present disclosure provides a display system that suppresses position displacement of an image with high accuracy.

A display system of the present disclosure includes an information acquisition device, a display processing device, a posture detection device, and a correction processing device. The information acquisition device acquires a position of a moving body and information outside the moving body. The display processing device controls display of an image and outputs display information indicating whether or not the image is being displayed. The posture detection device detects posture variation of the moving body. The correction processing device sets a correction amount of a display position of the image based on posture variation of the moving body, outputs the correction amount when the display information acquired from the display processing device indicates that the image is being displayed, and reduces size of the correction amount when the display information indicates that the image is not being displayed. The display processing device controls a display position of the image based on a position of the moving body, the information outside the moving body, and the correction amount.

These general and specific aspects may be realized by a system, a method, and a computer program, and a combination of these.

According to the display system of the present disclosure, a display processing device that controls the display of an image and a correction processing device that sets a correction amount of a display position of an image based on a posture variation of a moving body bidirectionally communicate with each other. In this manner, it is possible to accurately suppress position displacement of the image. Specifically, it is possible to suppress a detection error of the posture of the moving body and to detect the posture of the moving body with high accuracy.

DETAILED DESCRIPTION (Findings That Form the Basis of the Present Disclosure)

In a case where a display position of an image is corrected according to a state (for example, posture) of a moving body detected based on the output of a sensor, a correction error due to noise of the sensor occurs. Therefore, if correction is performed constantly or for a long time based on the output of the sensor, the correction error is accumulated, and there is a case where the display position of the image is greatly displaced with respect to a predetermined display target (for example, road) in an actual view.

For example, it is conceivable to use a gyro sensor in order to detect, with high accuracy, vibration of a moving body due to a shape such as unevenness of a road surface. Angles (roll angle, pitch angle, and yaw angle) in the three axial directions of the moving body are obtained by integrating the angular velocities detected by the gyro sensor. However, in the gyro sensor, due to the characteristics of a device, what is called drift occurs in which the angular velocity of the output does not become zero even in a stationary state. Therefore, in the integral calculation of the angular velocity, an error due to the drift is accumulated, and an error is generated in the obtained angle. In this case, if a display position of an image is continuously corrected based on the output of the gyro sensor, the correction error becomes large. Therefore, a viewer feels uncomfortable with the display of the image.

The display system of the present disclosure returns the display position of the image to a reference position when the image is not displayed. In this manner, the correction error due to noise of a sensor that detects the posture variation of a moving body is reduced. For example, the correction error caused by the drift of the gyro sensor is reduced.

First Embodiment

Hereinafter, the first embodiment will be described with reference to the drawings. In the first embodiment, a case where the moving body is a vehicle such as an automobile and the display system is a head-up display (HUD) system that displays a virtual image as an image in front of the windshield of the vehicle will be described as an example.

1. Configuration of Display System

Figure 1:
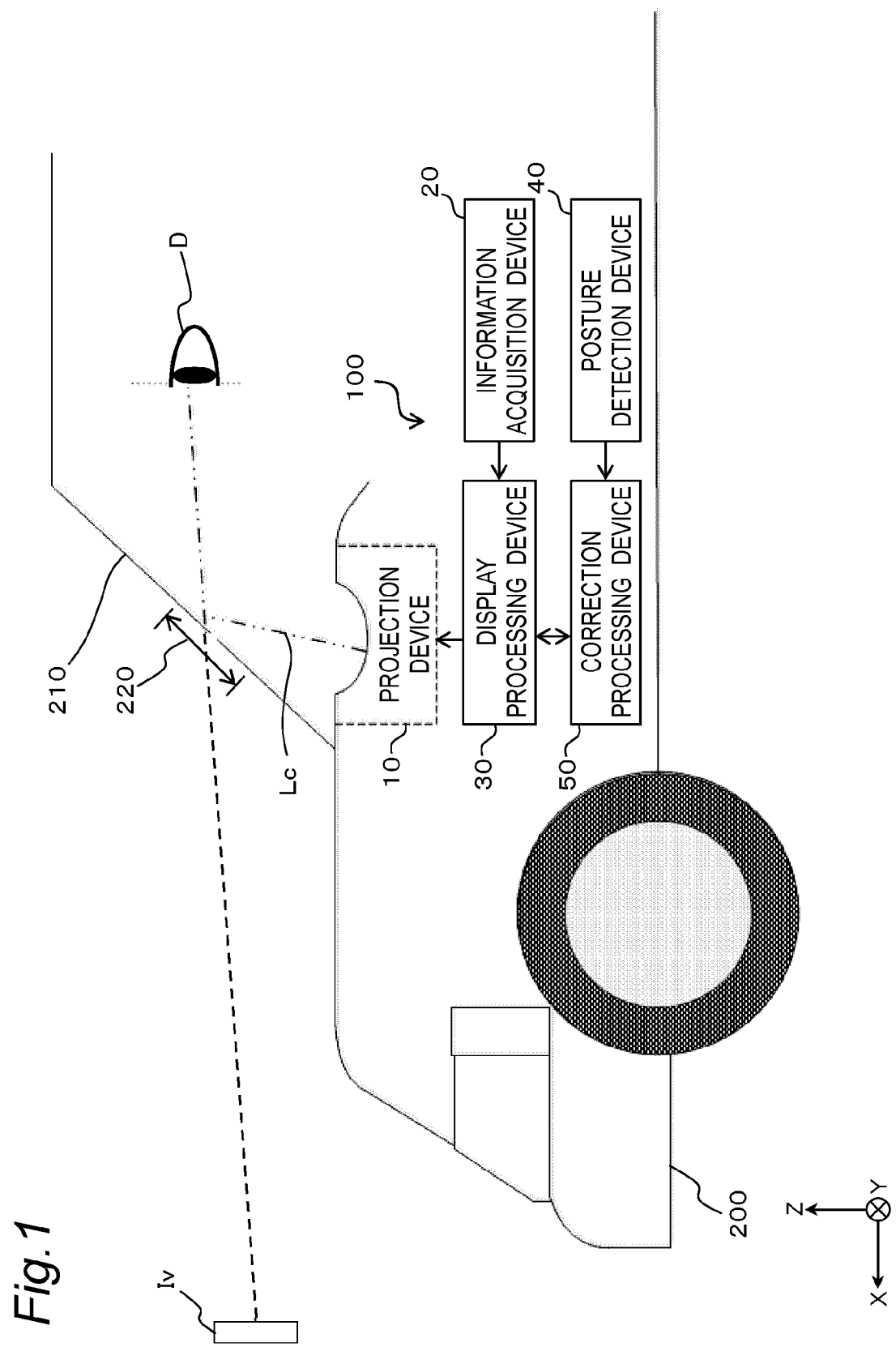
FIG. 1 is a diagram for explaining a head-up display (HUD) system.

FIG. 1 is a diagram for explaining the HUD system. In FIG. 1, a roll axis of a vehicle 200 is the X axis, a pitch axis of the vehicle 200 is the Y axis, and a yaw axis of the vehicle 200 is the Z axis. That is, the X axis is an axis that is orthogonal to the Y axis and the Z axis and is along a line-of-sight direction of an occupant D who visually recognizes a virtual image Iv. The Y axis is an axis along the left-right direction when viewed from the occupant D who visually recognizes the virtual image Iv. The Z axis is an axis along the height direction of the vehicle 200.

A display system 100 of the present embodiment is an HUD system that performs what is called augmented reality (AR) display in which the virtual image Iv is superimposed on an actual view in front of a windshield 210 of the vehicle 200. The virtual image Iv indicates predetermined information. For example, the virtual image Iv is a figure and a character indicating a route for guiding to a destination, an estimated time of arrival at the destination, a traveling direction, a speed, various warnings, and the like. The display system 100 is installed in the vehicle 200 and projects display light Lc representing the virtual image Iv into a display area 220 of the windshield 210 of the vehicle 200. In the present embodiment, the display area 220 is a partial area of the windshield 210. Note that the display area 220 may be the entire area of the windshield 210. The display light Lc is reflected by the windshield 210 toward the inside of the vehicle. In this manner, the occupant (viewer) D in the vehicle 200 visually recognizes the reflected display light Lc as the virtual image Iv in front of the vehicle 200.

The display system 100 includes a projection device 10, an information acquisition device 20, a display processing device 30, a posture detection device 40, and a correction processing device 50.

The projection device 10 projects the display light Lc representing the virtual image Iv into the display area 220. The projection device 10 includes, for example, a liquid crystal display element that displays an image of the virtual image Iv, a light source such as an LED that illuminates the liquid crystal display element, a mirror and a lens that reflect the display light Lc of the image displayed by the liquid crystal display element onto the display area 220, and the like. The projection device 10 is installed, for example, in the dashboard of the vehicle 200.

The information acquisition device 20 acquires a position of the vehicle and information outside the vehicle. Specifically, the information acquisition device 20 measures a position of the vehicle 200 and generates position information indicating the position. The information acquisition device 20 further acquires outside-vehicle information indicating an object, a distance to the object, and the like. The object is a person, a sign, a road, or the like. The information acquisition device 20 outputs vehicle-related information including the position information of the vehicle 200 and the outside-vehicle information.

The display processing device 30 controls the display of the virtual image Iv based on the vehicle-related information and the like obtained from the information acquisition device 20 and outputs image data of the virtual image Iv to the projection device 10. The display processing device 30 may control the display of the virtual image Iv based on a display timing (display time) of the virtual image Iv or a combination of the vehicle-related information and the display timing. The display timing is, for example, repetition of display for ten seconds and non-display for one second.

The posture detection device 40 detects a posture variation of the vehicle 200.

The correction processing device 50 calculates a correction amount of the display position of the virtual image Iv based on the posture variation of the vehicle 200 detected by the posture detection device 40.

Figure 2:
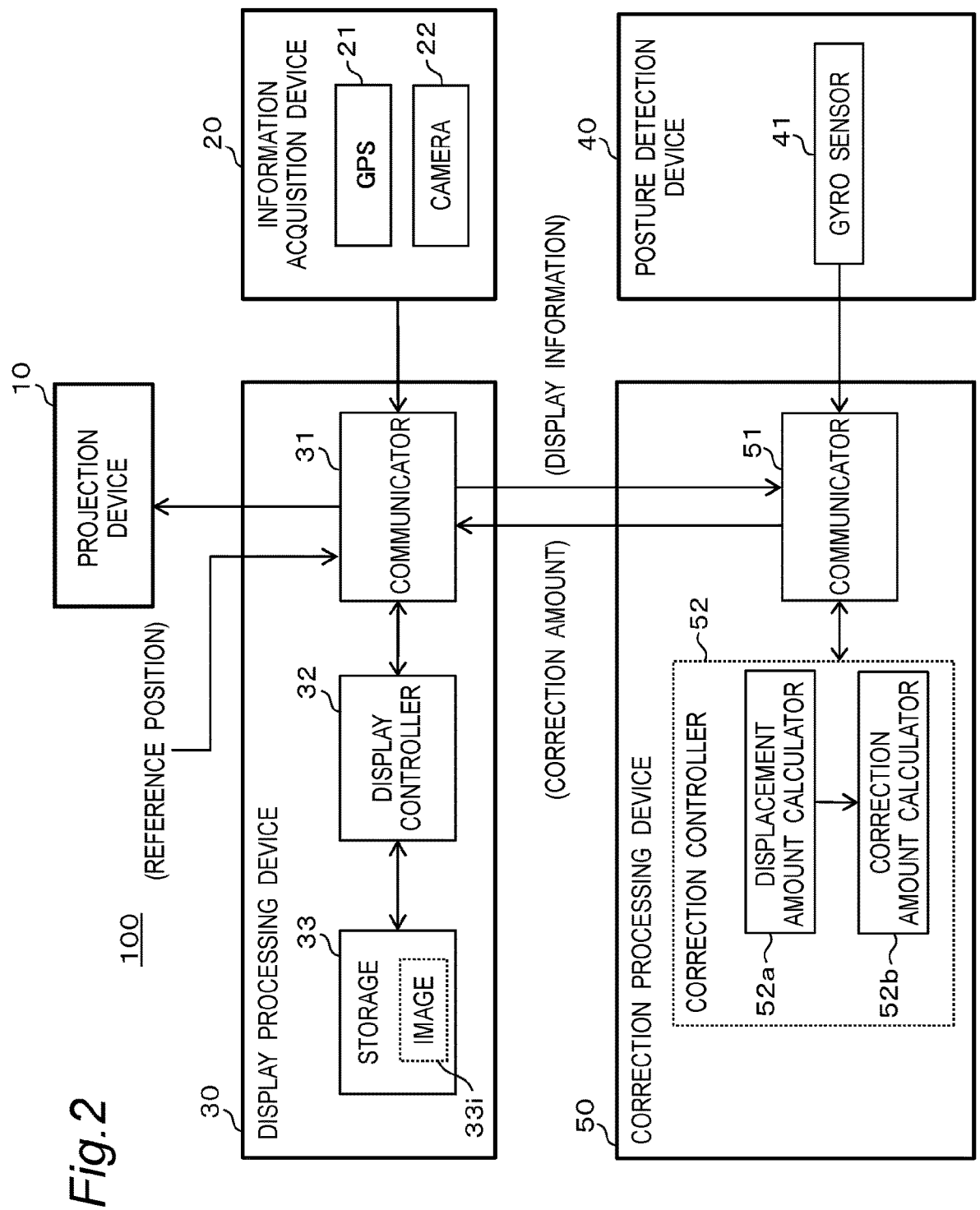
FIG. 2 is a block diagram showing a configuration of a display system according to first to fourth embodiments.

FIG. 2 is a block diagram showing an internal configuration of the display system 100.

In the present embodiment, the information acquisition device 20 includes a global positioning system (GPS) module 21 that detects a position indicating the current position of the vehicle 200 in the geographical coordinate system. Specifically, the GPS module 21 receives radio waves from GPS satellites and measures the latitude and longitude of the receiving point. The GPS module 21 generates position information indicating the measured latitude and longitude. The information acquisition device 20 further includes a camera 22 that captures an outside view and generates captured image data. The information acquisition device 20, for example, identifies an object from the captured image data by image processing and measures a distance to the object. The information acquisition device 20 generates, as the outside-vehicle information, information indicating an object, a distance to the object, and the like. The information acquisition device 20 outputs the vehicle-related information including the position information and the outside-vehicle information to the display processing device 30. Note that the captured image data generated by the camera 22 may be output to the display processing device 30.

The display processing device 30 includes a communicator 31, a display controller 32, and a storage 33.

The communicator 31 includes a circuit that communicates with external devices in compliance with a predetermined communication standard (for example, LAN, Wi-Fi (registered trademark), Bluetooth (registered trademark), USB, HDMI (registered trademark), controller area network (CAN), or serial peripheral interface (SPI)).

The display controller 32 can be realized by a semiconductor element or the like. The display controller 32 can be composed of, for example, at least one of a microcomputer, a CPU, an MPU, a GPU, a DSP, an FPGA, and an ASIC. A function of the display controller 32 may be configured only by hardware, or may be realized by combining hardware and software. The display controller 32 realizes a predetermined function by reading data and a program stored in the storage 33 and performing various types of arithmetic processing.

The storage 33 is a storage medium that stores a program and data required to realize a function of the display processing device 30. The storage 33 can be realized by, for example, a hard disk (HDD), an SSD, a RAM, a DRAM, a ferroelectric memory, a flash memory, a magnetic disk, or a combination of these.

The storage 33 stores a plurality of pieces of image data 33$i$ representing the virtual image Iv. The display controller 32 determines the virtual image Iv to be displayed based on the vehicle-related information obtained from the information acquisition device 20. The display controller 32 reads out the image data 33$i$ of the determined virtual image Iv from the storage 33 and outputs the data to the projection device 10. Furthermore, the display controller 32 sets the display position of the virtual image Iv. The display controller 32 outputs display information indicating whether the virtual image Iv is to be displayed or not or is being displayed or not to the correction processing device 50.

In the present embodiment, the posture detection device 40 includes a gyro sensor 41 that detects an angular velocity. The gyro sensor 41 outputs the detected angular velocity to the correction processing device 50 as posture variation information indicating a posture variation of the vehicle 200.

The correction processing device 50 includes a communicator 51 and a correction controller 52.

The communicator 51 includes a circuit that communicates with external devices in compliance with a predetermined communication standard (for example, LAN, Wi-Fi (registered trademark), Bluetooth (registered trademark), USB, HDMI (registered trademark), controller area network (CAN), or serial peripheral interface (SPI)).

The correction controller 52 can be realized by a semiconductor element or the like. The correction controller 52 can be composed of, for example, at least one of a microcomputer, a CPU, an MPU, a GPU, a DSP, an FPGA, and an ASIC. A function of the display controller 32 may be configured only by hardware, or may be realized by combining hardware and software. The correction controller 52 realizes a predetermined function by reading data and a program stored in a storage (not shown) in the correction processing device 50 and performing various types of arithmetic processing.

The correction controller 52 includes a displacement amount calculator 52$a$ and a correction amount calculator 52$b$ as a functional configuration.

The displacement amount calculator 52$a$ calculates the posture (angle displacement amount) of the vehicle 200 based on the posture variation information output by the posture detection device 40. For example, the displacement amount calculator 52$a$ calculates angles (a roll angle, a pitch angle, and a yaw angle) in the three axis directions of the vehicle 200 by integrating the angular velocities detected by the gyro sensor 41. In this manner, a displacement, amount (angle) of the vehicle 200 in the X-axis (roll axis), Y-axis (pitch axis), and Z-axis (yaw axis) directions shown in FIG. 1 can be calculated. Note that, in the present embodiment, all angles in the three-axis directions are calculated. However, the angles in the uniaxial or biaxial directions may also be calculated. For example, the configuration may be such that only the angles in the Y-axis and Z-axis directions are calculated.

The correction amount calculator 52$b$ calculates a correction amount of the display position of the virtual image Iv according to the posture (angle displacement amount) of the vehicle 200. Specifically, the correction amount calculator 52$b$ converts the displacement amount of the angles (pitch angle and yaw angle) calculated by the displacement amount calculator 52$a$ into the number of pixels, and determines a correction amount by which the number of pixels corresponding to the displacement (hereinafter, also referred to as "the number of displacement pixels") is eliminated. The roll angle is output as an angle without being converted. For example, the displacement amount calculator 52$a$ determines a correction amount by which a displacement amount of the roll angle is eliminated. In the present embodiment, the correction amount is indicated by the number of pixels in the Y-axis direction and the Z-axis direction. The correction amount calculator 52$b$ outputs the calculated correction amount to the display processing device 30.

The display processing device 30 and the correction processing device 50 bidirectionally communicate with each other by the communicators 31 and 51. The display processing device 30 outputs the display information to the correction processing device 50. The correction processing device 50 outputs the correction amount to the display processing device 30.

Figure 3A:
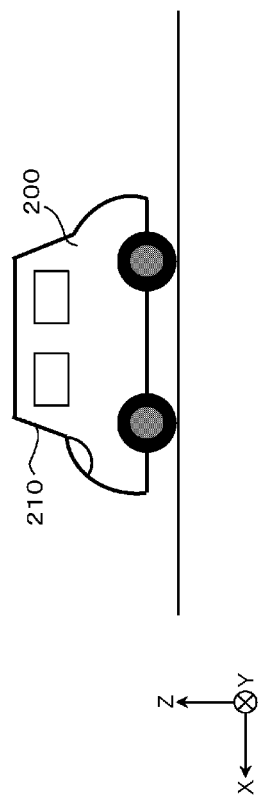
FIG. 3A is a diagram showing an example when a vehicle does not lean.
Figure 3B:
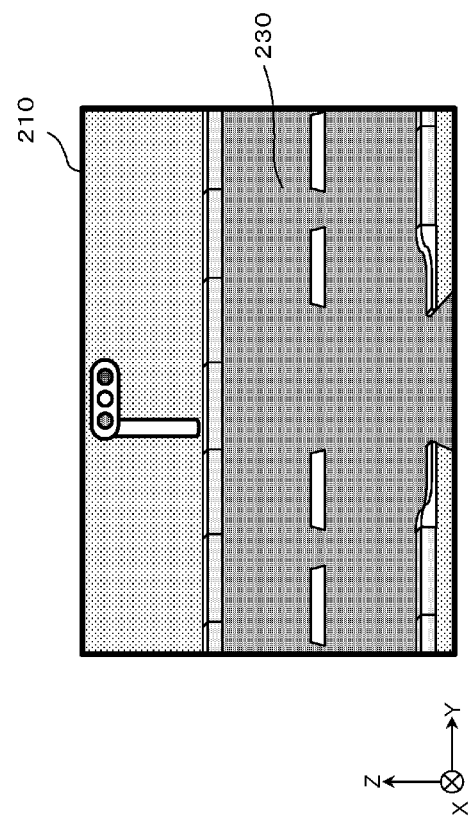
FIG. 3B is a diagram showing an example of an actual view as seen from a windshield.
Figure 3C:
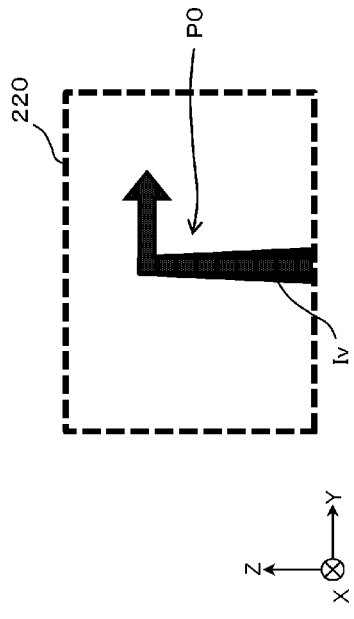
FIG. 3C is a diagram showing an example in which a virtual image is displayed at a reference position.
Figure 3D:
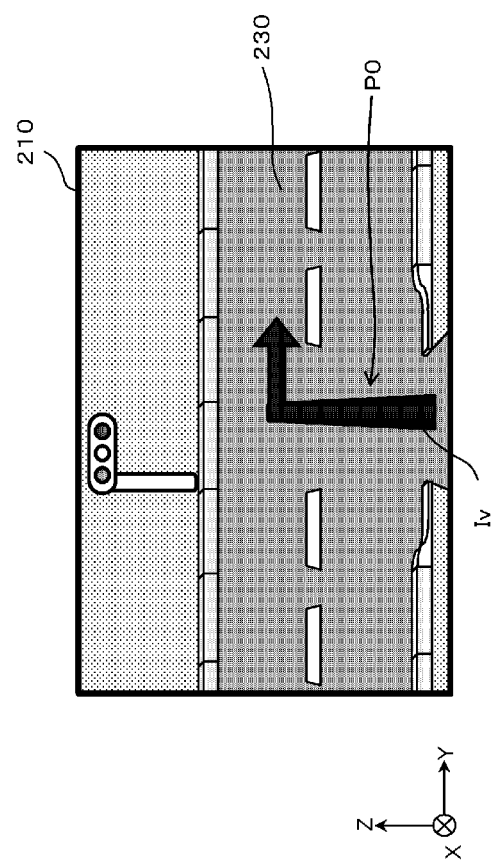
FIG. 3D is a diagram showing an example of augmented reality (AR) display.

AR display will be described with reference to FIGS. 3A to 3D. FIG. 3A shows an example when the vehicle 200 does not lean. FIG. 3B shows an example of an actual view seen from the windshield 210 of the vehicle 200 shown in FIG. 3A. FIG. 3C shows an example of the virtual image Iv seen from the display area 220. FIG. 3D shows an example in which the virtual image Iv shown in FIG. 3C is displayed in a manner superimposed on the actual view shown in FIG. 3B. The display system 100 superimposes the virtual image Iv shown in FIG. 3C on the actual view shown in FIG. 3B. A reference position (initial position) P0 of the virtual image Iv is a position determined based on the type of the virtual image Iv, the state of the vehicle 200 (position and posture), map data, and the like, and the reference position P0 is determined by an external device. For example, in a case where a display target 230 is a cruising lane and the virtual image Iv is an arrow indicating a traveling direction, the reference position P0 is the center of the cruising lane. The reference position P0 is set, for example, by the values of the Y coordinate and the Z coordinate in the display area 220 in FIG. 3C. The reference position P0 is acquired from an external device. The external device can be composed of, for example, a microcomputer, a CPU, an MPU, a GPU, a DSP, an FPGA, or an ASIC and the GPS module 21. A function of the external device may be configured only by hardware, or may be realized by combining hardware and software. The reference position P0 output from the external device may change based on the number of occupants, a change in the load, and a variation in the posture due to a decrease in gasoline and the like, and may be, for example, different from the reference position (initial position) acquired first. Therefore, the display processing device 30 may change the reference position P0 acquired from the external device based on the number of occupants, the change in the load, and the variation in the posture due to the decrease in gasoline and the like. Note that the display processing device 30 may set the reference position P0 based on the vehicle-related information, the map data, and the like. The display processing device 30 may set the size of the virtual image Iv based on the vehicle-related information.

Figure 4A:
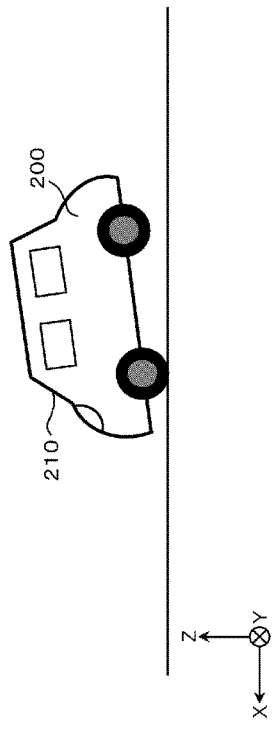
FIG. 4A is a diagram showing a forward leaning posture of a vehicle.
Figure 4B:
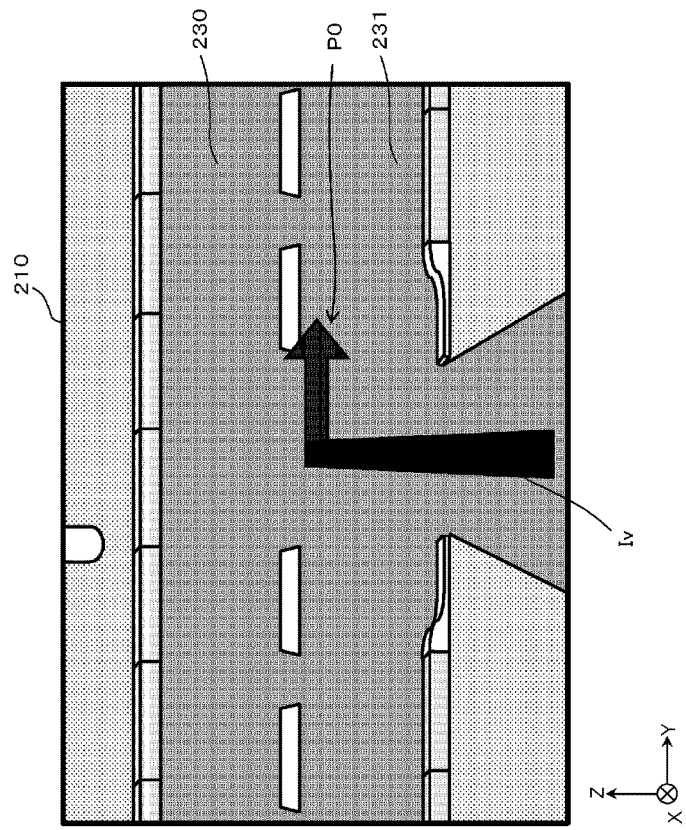
FIG. 4B is a diagram for explaining an example in which position displacement of a virtual image occurs when a vehicle is in a forward leaning posture.
Figure 4C:
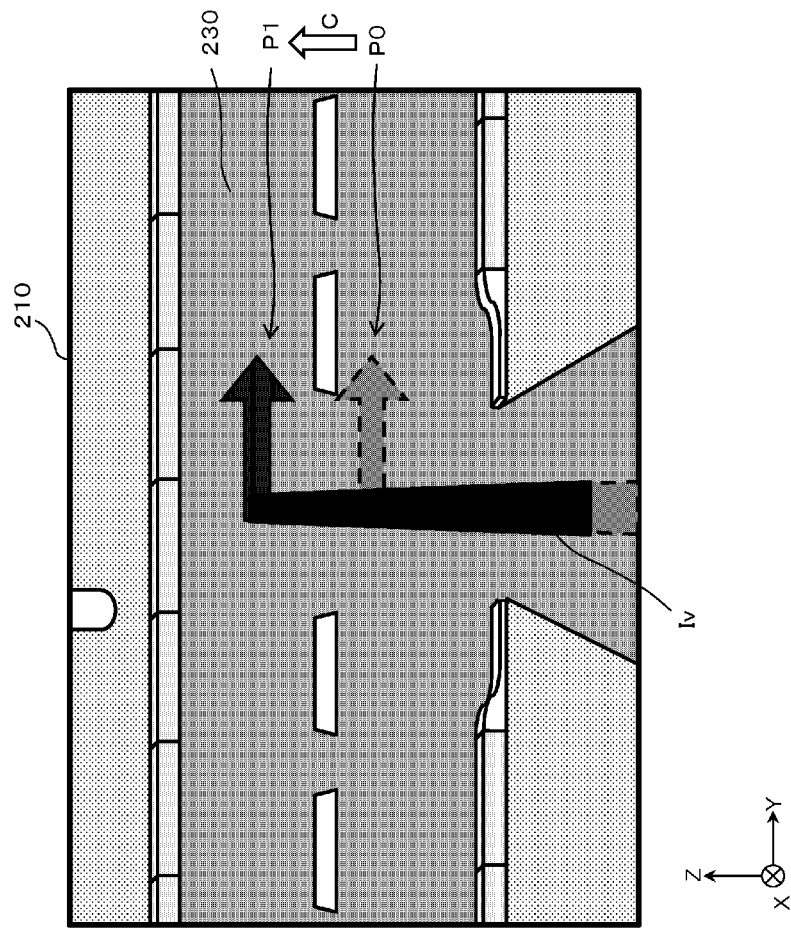
FIG. 4C is a diagram showing a display example of a virtual image after correction.

FIG. 4A shows an example of a state in which vehicle 200 is in a forward leaning posture. FIG. 4B illustrates a case where the display position of the virtual image Iv is displaced from the display target 230 according to the posture variation of the vehicle 200. FIG. 4C shows the display position of the virtual image Iv after correction.

The vehicle 200 may lean due to unevenness of the road surface, sudden acceleration or deceleration of the vehicle 200, or the like. For example, when the vehicle 200 suddenly decelerates, the vehicle 200 takes a forward leaning posture as shown in FIG. 4A. In this case, as shown in FIG. 4B, the position of display target 230 seen from windshield 210 changes according to the inclination of vehicle 200. For this reason, in a case where the virtual image Iv is displayed at the reference position P0, the virtual image Iv is displaced from the display target 230. For example, as shown in FIG. 4B, the tip of the arrow is in an opposite lane 231. Therefore, the display system 100 adjusts the display position of the virtual image Iv in the direction of eliminating the displacement according to the posture of the vehicle 200. Specifically, as shown in FIG. 4C, the correction processing device 50 calculates a correction amount C so that the display position becomes a position P1 where there is no displacement in the display position due to the angle of the vehicle 200. That is, the display processing device 30 sets the display position of the virtual image Iv to "reference position P0+correction amount C". In this manner, the projection device 10 can display the virtual image Iv at the position P1 corresponding to the display target 230. As described above, even in a case where the vehicle 200 leans, the display position of the virtual image Iv is changed from the reference position P0 based on the correction amount C, so that the virtual image Iv can be displayed at the position P1 corresponding to the display target 230 in the actual view.

Figure 5:
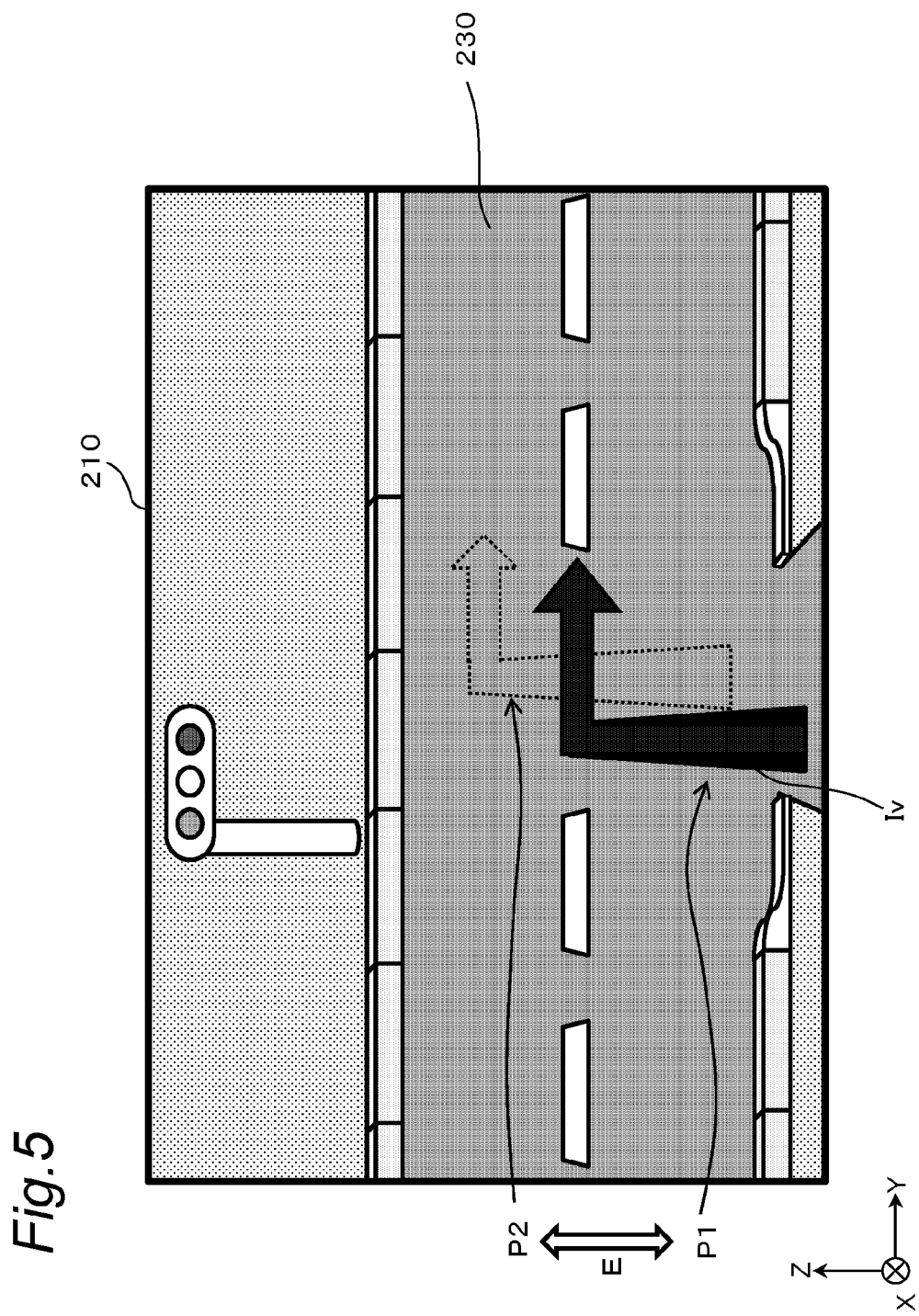
FIG. 5 is a diagram for explaining position displacement of a virtual image due to noise of a sensor.

FIG. 5 illustrates a case where the display position of the virtual image Iv is displaced from the display target 230 due to noise of a sensor such as the gyro sensor 41. As described above, for example, the angular velocity detected by the gyro sensor 41 includes an error due to drift. Therefore, if the calculation of the correction amount based on the integral calculation of the angular velocity is continued for a long time, the error included in the correction amount becomes large. In this case, for example, even when the vehicle 200 does not actually lean, it is detected that the vehicle 200 leans, and the correction amount C does not become zero. For this reason, the display position (=reference position P0+correction amount C) of the virtual image Iv is displaced more from the display target 230 as the duration of the correction processing of the virtual image Iv becomes longer. For example, the actually displayed position P1 (=reference position P0+correction amount C) does not become a position P2 at which the virtual image Iv is to be displayed with respect to the display target 230. In the present embodiment, in order to reduce a position displacement E caused by the noise of the sensor, the correction amount C is reset to zero when the virtual image Iv is not displayed, as described later. In this manner. when the virtual image Iv is not displayed, the display position of the virtual image Iv is returned to the desired position P2.

2. Operation of Display Processing Device

Figure 6:
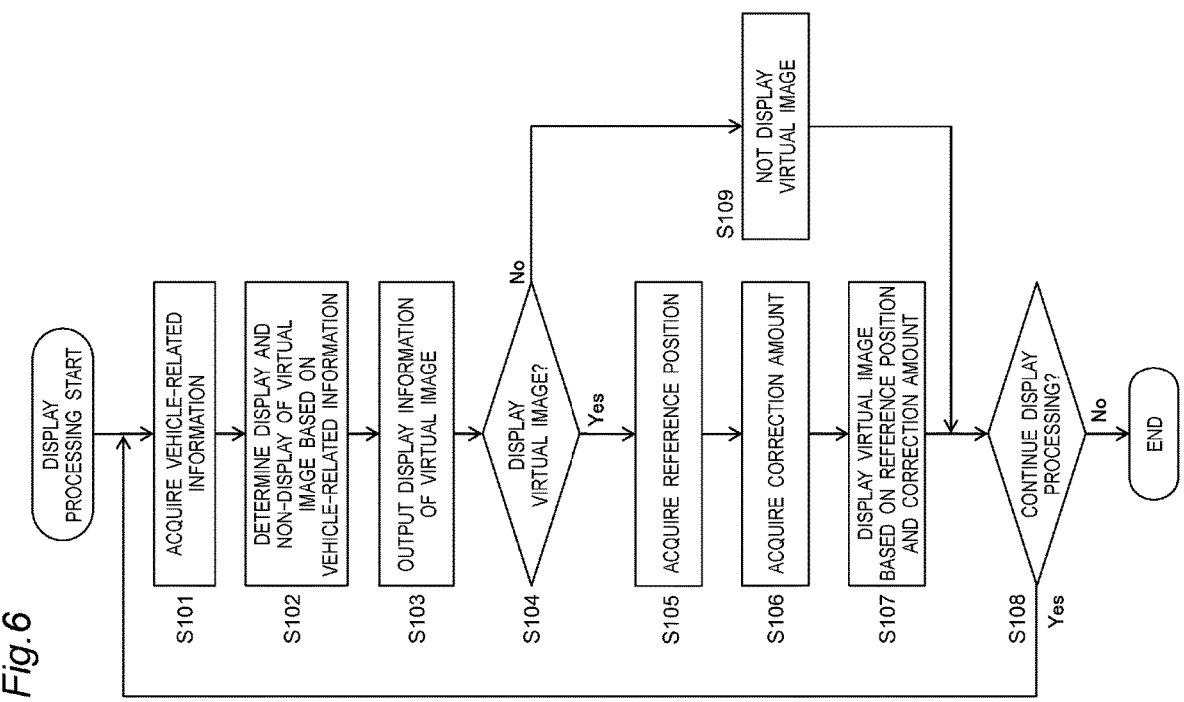
FIG. 6 is a flowchart showing display processing in the first embodiment.

FIG. 6 shows display processing performed by the display controller 32 of the display processing device 30. The display processing shown in FIG. 6 is started, for example, when the engine of the vehicle 200 is started or when a button for instructing the start of displaying the virtual image Iv is operated.

The display controller 32 acquires the vehicle-related information from the information acquisition device 20 (S101). The display controller 32 determines whether or not to display the virtual image Iv corresponding to the display target based on the vehicle-related information (S102). The display controller 32 outputs the display information indicating whether the virtual image Iv is to be displayed or not or is being displayed or not to the correction processing device 50 (S103). In a case of determining to display the virtual image Iv (Yes in S104), the display controller 32 acquires the reference position P0 of the virtual image Iv from an external, device (S105). The display controller 32 acquires the correction amount C of the display position output from the correction processing device 50 (S106).

The display controller 32 causes the projection device 10 to display the virtual image Iv based on the reference position P0 and the correction amount C (S107). For example, the display controller 32 reads the image data 33i of the virtual image Iv corresponding to the display target from the storage 33, sets the display position of the virtual image Iv to "reference position P0+correction amount C", and outputs the image data 33i set the display position to the projection device 10.

The display controller 32 determines whether or not to continue the display processing (S108). For example, the display controller 32 ends the display processing when the engine of the vehicle 200 is stopped or when a button for giving an instruction to end the display of the virtual image Iv is operated. In a case where the display processing is continued, the processing returns to Step S101. In a case of determining not to display the virtual image Iv (No in S104), the display controller 32 hides the virtual image Iv (S109).

3. Operation of Correction Processing Device

Figure 7:
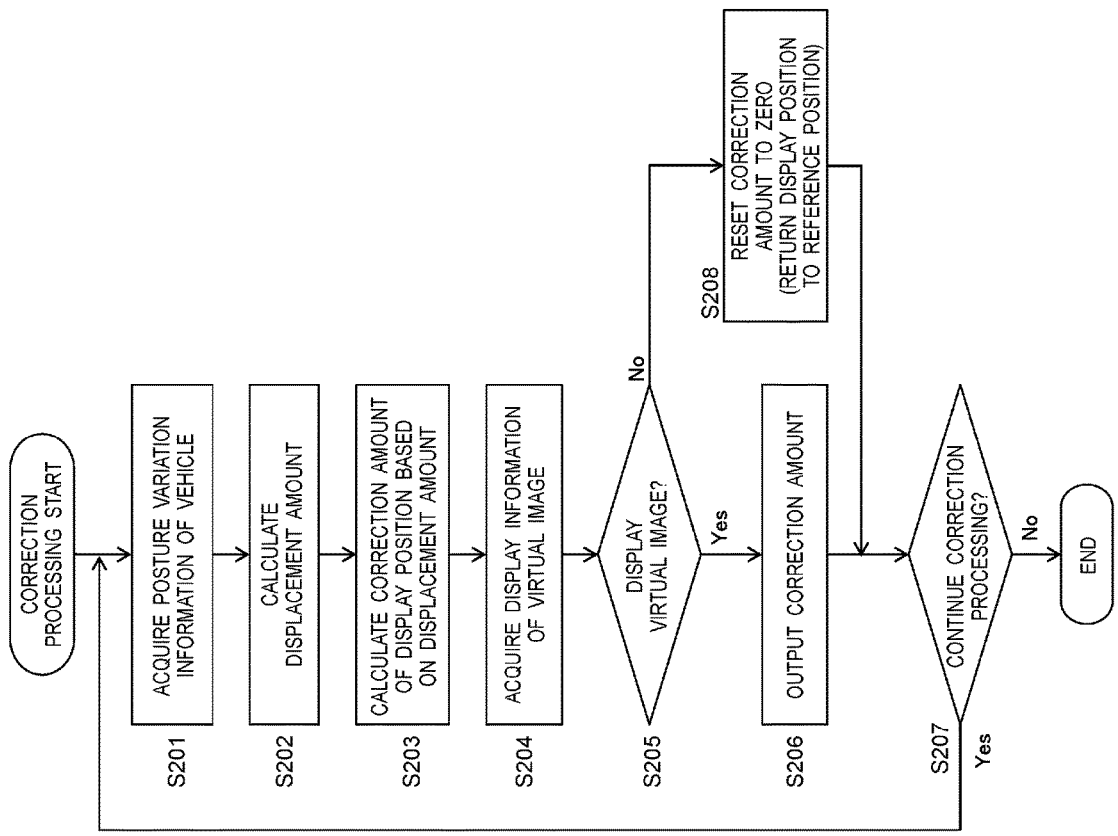
FIG. 7 is a flowchart showing correction processing in the first embodiment.

FIG. 7 shows correction processing performed by the correction controller 52 of the correction processing device 50. The correction processing shown in FIG. 7 is started, for example, when the engine of the vehicle 200 is started or when a button for instructing the start of displaying the virtual image Iv is operated. The correction processing of FIG. 7 is started, for example, together with the display processing of FIG. 6. Note that the correction processing shown in FIG. 7 may be started when the button for instructing the start of the position correction of the virtual image Iv is operated.

The displacement amount calculator 52a acquires the posture variation information indicating the angular velocity output from the gyro sensor 41 (S201). The displacement amount calculator 52a calculates the posture of the vehicle 200, that is, the displacement amount which is an angle with respect to the three-axis directions, based on the acquired posture variation information (S202). Specifically, the displacement amount calculator 52a calculates the angle of the vehicle 200 by integrating the angular velocity. The correction amount calculator 52b calculates the correction amount C of the display position of the virtual image Iv based on the displacement amount with respect to the three-axis directions (S203). Specifically, the correction amount calculator 52b converts the displacement amount, which is the angle of the vehicle 200, into the number of pixels for the pitch angle and the yaw angle, and determines the correction amount C that cancels the displacement amount, indicated by the number of pixels. For the roll angle, the correction amount C that cancels the displacement amount as an angle is determined.

In the present embodiment, the correction amount C is defined as "the correction amount C=−(current displacement amount)+(displacement amount during non-display)". Hereinafter, the displacement amount during non-display will be also referred to as an offset value. The offset value is set in Step S208 described later. The initial value of the offset value is, for example, zero. In the calculation of the correction amount in Step S203, the configuration may be such that the displacement amount calculator 52a calculates, in units of angle, "−current posture (angle)+offset value (angle)" and outputs the value to the correction amount calculator 52b, and the calculator 52b converts the input value into the number of pixels. Further, the configuration may be such that the displacement amount calculator 52a outputs the current posture (angle) to the correction amount calculator 52b, and the correction amount calculator 52b converts the posture (angle) into the number of pixels, and then calculates "−current displacement amount (number of pixels)+offset value (number of pixels)".

The correction amount calculator 52b acquires the display information transmitted from the display processing device 30 (S204). The display information indicates whether the virtual image Iv is to be displayed or not or is being displayed or not.

In a case where the virtual image is to be displayed or is already being displayed (Yes in S205), the correction amount calculator 52b outputs the calculated correction amount C to the display processing device 30 (S206). In this manner, the virtual image Iv is displayed at the position indicated by the "reference position P0+correction amount C".

Figure 8:
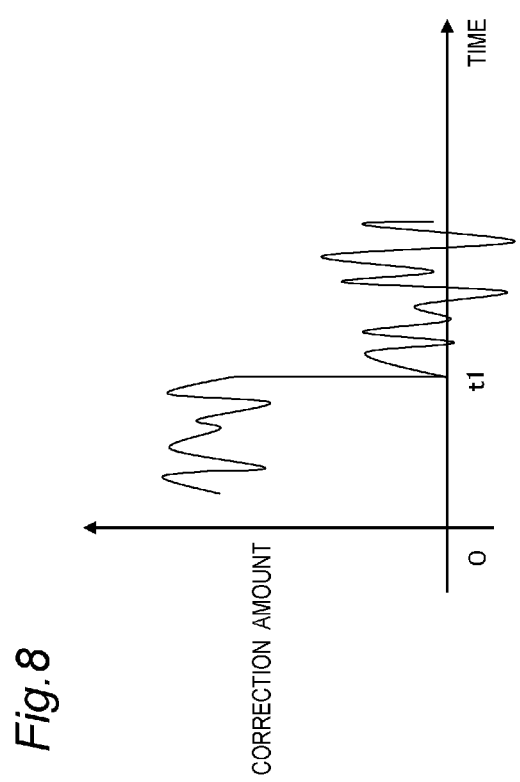
FIG. 8 is an explanatory diagram showing an example of resetting a correction amount to zero.

In a case where the virtual image is not displayed (No in S205), the correction controller 52 resets the correction amount C to zero (S208). Specifically, for example, the displacement amount calculator 52a sets the offset value (angle) to "offset value (angle)=posture (angle)". In this manner, the angle indicated by "−posture (angle)+offset value (angle)", that is, zero degrees is output from the displacement amount calculator 52a to the correction amount calculator 52b. Alternatively, the correction amount calculator 52b converts the posture (angle) calculated by the displacement amount calculator 52a into the number of pixels (the number of displacement pixels), and sets the offset value (the number of pixels) to "offset value (number of pixels)=number of displacement pixels". In this manner, the correction amount C calculated by "−displacement amount (number of pixels)+offset value (number of pixels)" becomes zero. FIG. 8 is an explanatory diagram explaining an example of resetting the correction amount C to zero. For example, the correction amount C is immediately reset to zero at time t1. In this way, the display position is returned to the reference position P0 when the virtual image Iv is not displayed.

The correction controller 52 determines whether or not to continue the correction processing (S207). For example, the correction controller 52 ends the correction processing when the engine of the vehicle 200 is stopped or when a button for instructing the end of the display of the virtual image Iv is operated. In a case where the correction processing is continued, the processing returns to Step S201. After the processing returns to Step S201, the offset value set previously in Step S208 is used in the calculation of the correction amount in Step S203 next. Even after the correction amount C is reset to zero, the correction of the display position is continued based on the displacement amount.

As described above, in the present embodiment, "offset value=displacement amount" is set when the virtual image Iv is not displayed, so that the correction amount C is set to zero. In other words, the display position is reset to the reference position P0 when the virtual image Iv is not displayed. Since "correction amount C=−displacement amount+offset value", the "reference position P0+correction amount C" that is the display position when the virtual image Iv is displayed next time (Step S107 in FIG. 6) is equivalent, to "reference position P0+offset value−displacement amount". As the offset value is set to the displacement amount when the virtual image Iv is not displayed, the correction error due to the noise of the sensor output from the correction processing device 50 to the display processing device 30 is reset.

4. Effect, Supplement, and the Like

The display system 100 of the present disclosure includes the information acquisition device 20 that acquires the position of the vehicle 200 and the information outside the vehicle, the display processing device 30 that controls the display of the virtual image Iv based on the information acquired by the information acquisition device 20, the posture detection device 40 that detects posture variation of the vehicle 200, and the correction processing device 50 that sets the correction amount C of the display position of the virtual image Iv based on the posture variation of the vehicle 200. The display processing device 30 and the correction processing device 50 communicate with each other bidirectionally.

In this manner, it is possible to suppress a detection error of the vehicle posture due to noise of the posture detection device 40, and it is possible to detect the vehicle posture with high accuracy.

The display system 100 displays the virtual image Iv based on the reference position P0 and the correction amount C when the virtual image Iv is displayed, and returns the display position of the virtual image Iv to the reference position P0 when the virtual image Iv is not displayed. Specifically, the correction processing device 50 resets the correction amount C to zero when the virtual image Iv is not displayed.

By resetting the correction amount C to zero, it is possible to reduce the displacement amount of the display position due to the accumulation of noise of the sensor used to detect the vehicle posture. Further, since the reset is performed when the virtual image Iv is not displayed, it is possible to prevent the viewer from feeling uncomfortable due to the display position of the virtual image Iv fluctuating due to the reset. Further, since the correction amount is reset every time the virtual image Iv is hidden, the chance of resetting the correction amount increases. Therefore, the detection error of the vehicle posture due to the noise of the sensor can be suppressed, and the vehicle posture can be detected with high accuracy. Further, when the virtual image Iv is displayed, the display position is corrected by the correction amount C based on the vehicle posture. Therefore, it is possible to suppress the displacement of the display position due to the vehicle posture.

In the present embodiment, the correction amount C when the virtual image Iv is displayed is set based on the displacement amount of the display position based on the posture variation of the vehicle 200 when the virtual image Iv is displayed and the displacement amount (offset value) of the display position based on the posture variation of the vehicle 200 before the virtual image is displayed.

The display processing device 30 determines whether or not to display the virtual image Iv based on the position of the vehicle 200, information outside the vehicle, and the like. In this manner, the virtual image Iv can be displayed in association with the display target in the actual view. Therefore, it is possible for the viewer to visually recognize the information represented by the virtual image Iv without feeling discomfort.

The display system 100 of the present embodiment further includes the projection device 10 that projects light representing a virtual image. In the present embodiment, the moving body is a vehicle, and the image is a virtual image displayed in front of the windshield of the vehicle. According to the present embodiment, it is possible to suppress the displacement of the display position of the virtual image with high accuracy.

Note that the method of resetting the correction amount C to zero in Step S208 is optional. In the present embodiment, "correction amount C=−displacement amount+offset value" is used. However, the correction amount C may be "correction amount C=−displacement amount". In this case, the correction amount C is reset to zero by setting the displacement amount itself to zero. Specifically, in a case where the vehicle posture is calculated based on the output of the gyro sensor 41, the integration amount of the angular velocity calculated by the displacement amount calculator 52a is reset to zero.

Second Embodiment

In the first embodiment, the correction amount C is changed by the offset value. Specifically, when displaying the virtual image Iv, the display position is set to "reference position P0+correction amount C", and the correction amount C at this time is set to "correction amount C=−displacement amount offset value (displacement amount during non-display)". In the present embodiment, the reference position is changed by the offset value by setting "correction amount C=−displacement amount" and "reference position P0'=reference position P0+offset value (displacement amount during non-display)". The initial value of the offset value is, for example, zero.

Figure 9:
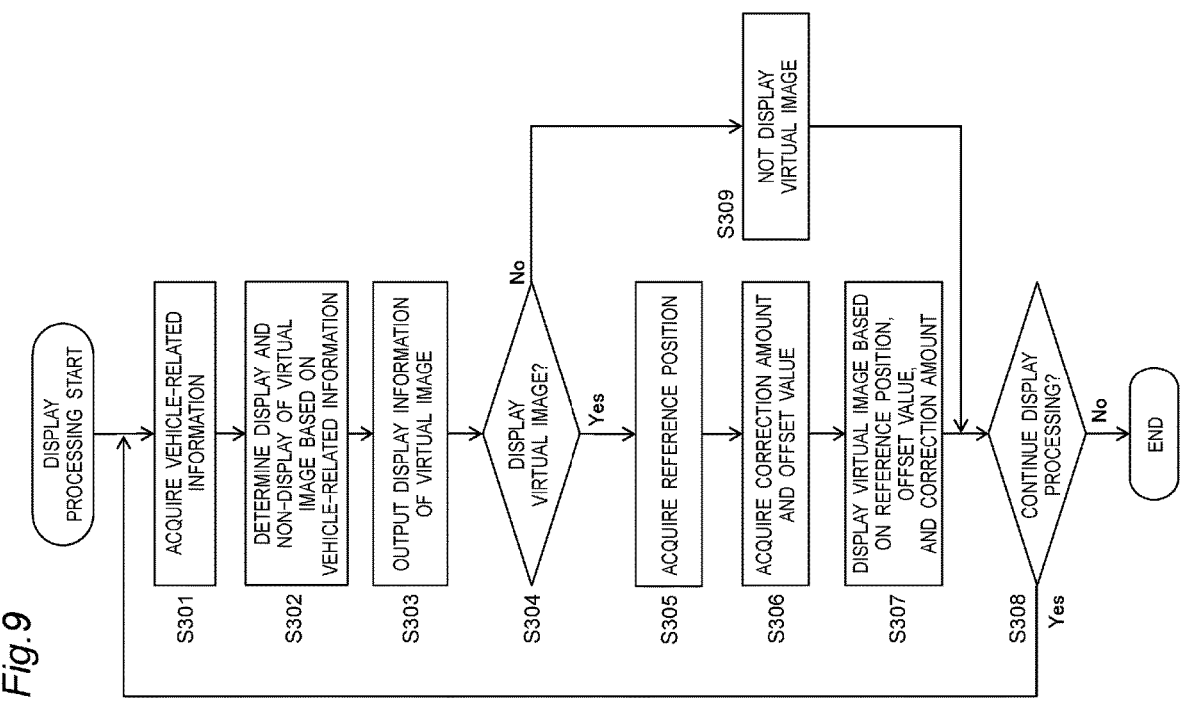
FIG. 9 is a flowchart showing the display processing in the second embodiment.

FIG. 9 shows the display processing performed by the display controller 32 of the display processing device 30. Steps S301 to S305, S308, and S309 of FIG. 9 of a second embodiment are the same as Steps S101 to S105, S108, and S109 of FIG. 6 of the first embodiment. In the present embodiment, when displaying the virtual image, the display controller 32 acquires the offset value (the number of pixels) together with the correction amount from the correction processing device 50 (S306). The display controller 32 sets the display position of the virtual image Iv to "reference position P0' (=reference position P0+offset value)+correction amount C (=−displacement amount)" and causes the projection device 10 to display the virtual image Iv (S307).

Figure 10:
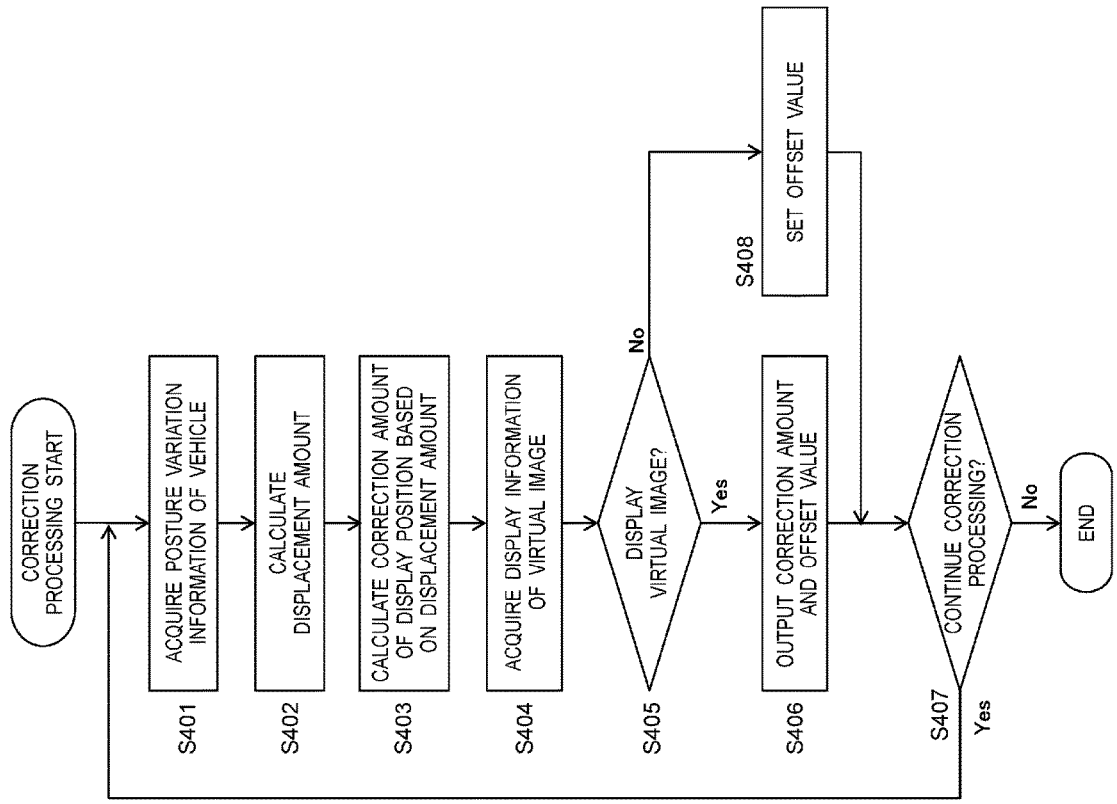
FIG. 10 is a flowchart showing the correction processing in the second embodiment.

FIG. 10 shows the correction processing performed by the correction controller 52 of the correction processing device 50. Steps S401 to S405 and S407 of FIG. 10 of the second embodiment, are the same as Steps S201 to S205 and S207 of FIG. 7 of the first embodiment. In the present embodiment, the correction controller 52 outputs the offset value (the number of pixels) together with the correction amount to the display processing device 30 when the virtual image Iv is displayed (S406). This offset value is set when the virtual image Iv is not displayed (S403). Specifically, the offset value is set to "offset value=displacement amount during non-display". In this manner, in Step S307 of FIG. 9, the reference position P0' of the virtual image Iv indicated by "reference position P0' (=reference position P0+offset value)" is shifted from the reference position P0 by the offset value.

Third Embodiment

In the first embodiment, the correction controller 52 resets the correction amount C to zero when the virtual image Iv is not displayed. In the present embodiment, the correction controller 52 reduces the size of the correction amount C by a certain amount in stages.

Figure 11:
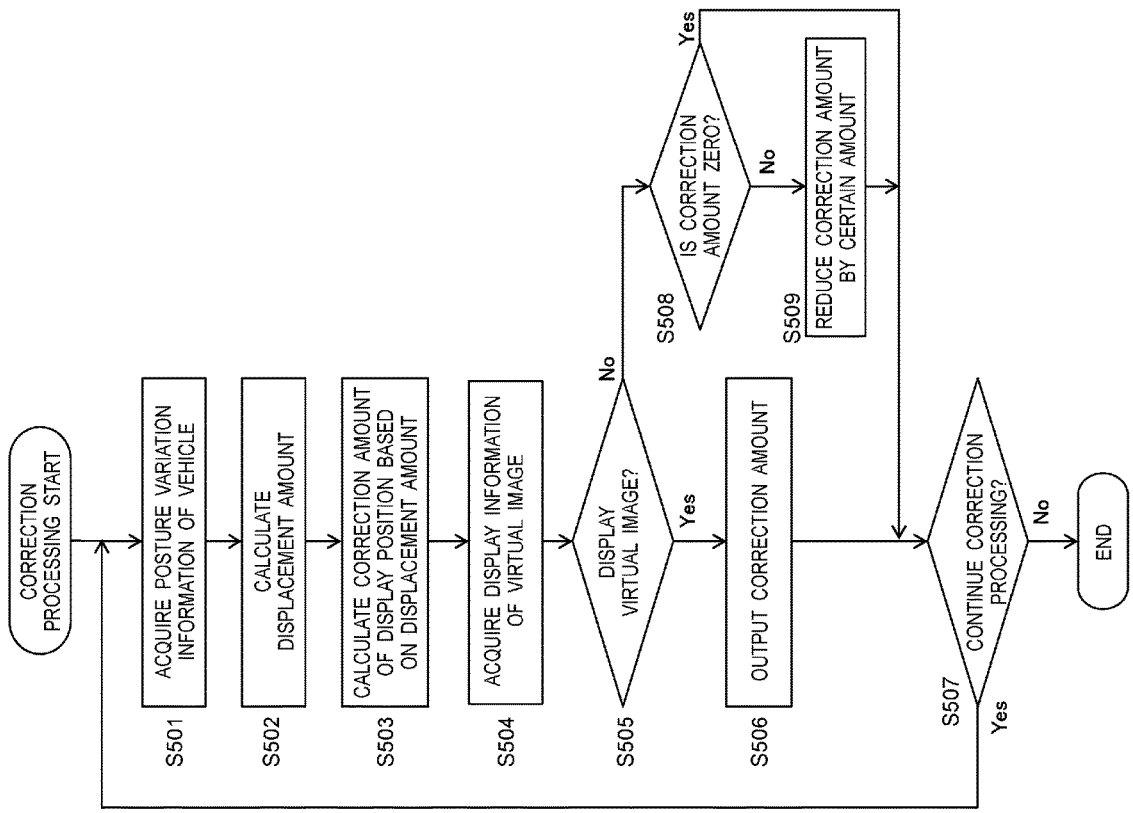
FIG. 11 is a flowchart showing the correction processing in the third embodiment.

FIG. 11 shows the correction processing in a third embodiment. Steps S501 to S507 of FIG. 11 of the third embodiment are the same as Steps S201 to S207 of FIG. 7 of the first embodiment.

Figure 12A:
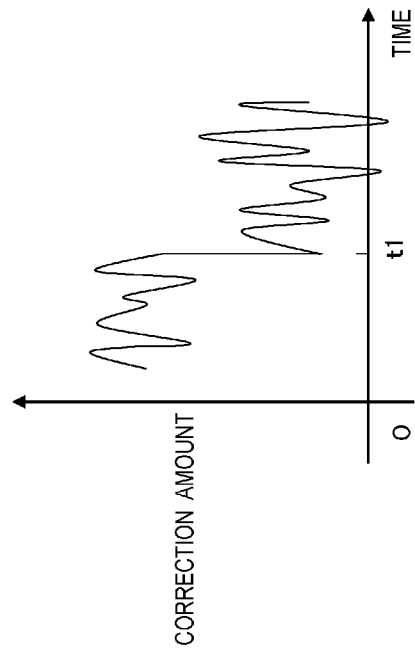
FIG. 12A is an explanatory diagram showing an example of reducing a correction amount by a certain amount.
Figure 12B:
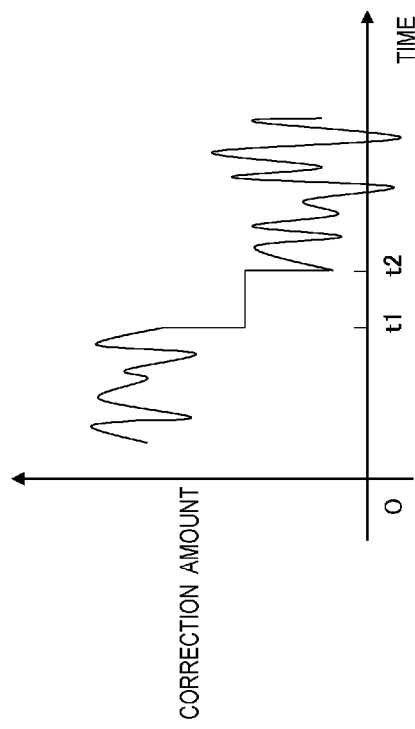
FIG. 12B is an explanatory diagram showing an example of reducing a correction amount by a certain amount.

In the present embodiment, in a case where the virtual image Iv is not displayed (No in S505), the correction amount calculator 52b determines whether or not the correction amount C calculated in Step S503 is zero (S508). If the correction amount C is not zero, the size of the correction amount C is reduced by a certain amount (S509). Specifically, for example, the correction amount calculator 52b sets "offset value=certain amount" in "correction amount C=−(displacement amount−offset value)". The certain amount may be set according to the display position in the display area 220 of the virtual image Iv. FIGS. 12A and 12B are explanatory diagrams for reducing the size of the correction amount C by a certain amount. As shown in FIG. 12A, for example, at time t1, the size of the correction amount C is reduced by the offset value of a certain amount. Further, the correction amount C may be reduced stepwise as shown in FIG. 12B. For example, the size of the correction amount C may be reduced by a fixed offset value at time t1, and may be reduced by the offset value again at time t2. Note that the number of times of reduction may be three or more, and the offset value may be changed depending on the number of times. If the correction amount C is zero, the processing proceeds to Step S507.

As described above, the correction processing device 50 reduces the correction amount C by a certain amount in stages when the virtual image Iv is not displayed. Accordingly, the position of the virtual image Iv gradually returns to the reference position P0. Since the position of the virtual image Iv does not suddenly change significantly, it is possible to prevent the occupant D from feeling uncomfortable with the change in the display position of the virtual image Iv. That is, it is possible to suppress a feeling of uncomfortableness due to the shift of the display position.

Note that, instead of reducing the correction amount C by a certain amount, the offset value shown in the second embodiment may be set to a value that is a certain amount smaller than the displacement amount when the image is not displayed.

Fourth Embodiment

When the virtual image is not displayed, the correction amount C is reset to zero in the first embodiment, and the size of the correction amount C is reduced by a certain amount in the third embodiment. In the present embodiment, the processing for the correction amount C is changed according to the size of the correction amount C. Specifically, in a case where the correction amount C is equal to or more than a threshold value, the correction amount C is reduced by a certain amount, and when the correction amount C is less than the threshold value, the correction amount is reset to zero.

Figure 13:
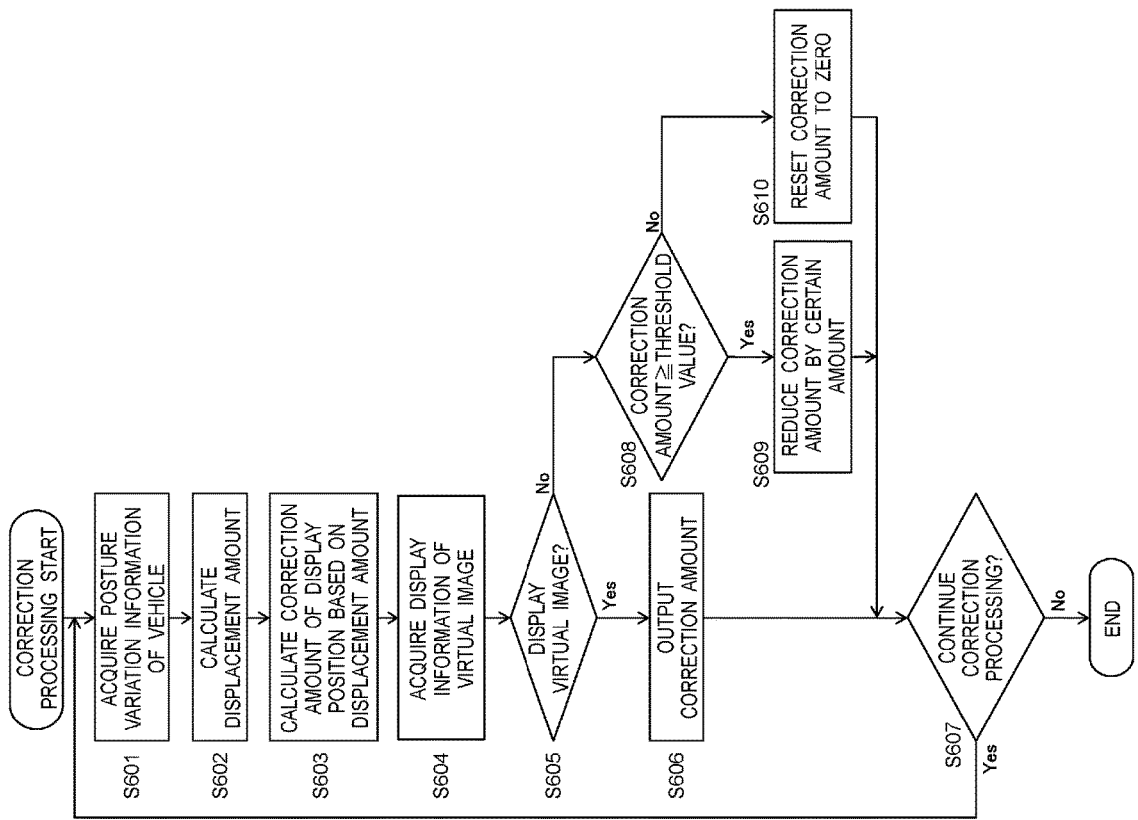
FIG. 13 is a flowchart showing the correction processing in the fourth embodiment.

FIG. 13 shows the correction processing in a fourth embodiment. Steps S601 to S607 of FIG. 13 of the fourth embodiment are the same as Steps S201 to S207 of FIG. 7 of the first embodiment and Steps S501 to S507 of FIG. 11 of the third embodiment.

Figure 14A:
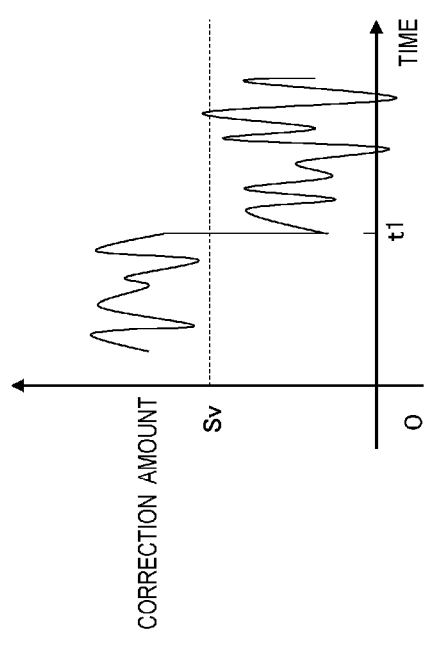
FIG. 14A is an explanatory diagram showing an example of reducing a correction amount by a certain amount.
Figure 14B:
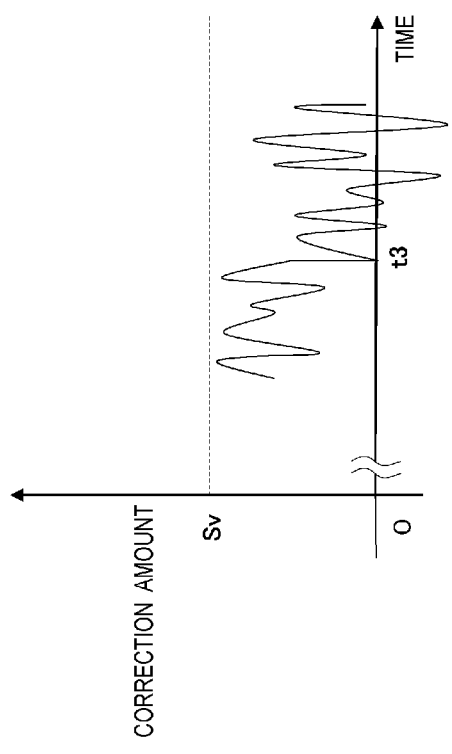
FIG. 14B is an explanatory diagram showing an example of resetting a correction amount to zero.

In the present embodiment, in a case where the virtual image is not displayed (No in S605), the correction amount calculator 52b determines whether or not the correction amount C calculated in Step S603 is equal to or more than a threshold value Sv (S608). As shown in FIG. 14A, if the correction amount C is equal to or more than the threshold value Sv, the correction amount C is reduced by a certain amount (S609). Specifically, for example, the correction amount calculator 52b sets "offset value=certain amount" in "correction amount C=−(displacement amount−offset value)". Note that the number of times of reduction may be three or more, and the offset value may be changed depending on the number of times. Further, as shown in FIG. 14B, if the correction amount C is less than the threshold value Sv, the correction amount C is reset to zero (S610). Specifically, "offset value=displacement amount" is set.

As described above, when the virtual image Iv is not displayed, the correction processing device 50 reduces the correction amount by a certain amount in stages in a case where the correction amount C is equal to or more than the threshold value, and resets the correction amount to zero in a case where the correction amount C is less than the threshold value. In this manner, the display position can be corrected according to the inclination of the vehicle 200 without causing any visual discomfort.

Fifth Embodiment

The first to fourth embodiments describe the display system 100 that displays a virtual image in front of the windshield of the vehicle 200. However, the correction of the display position of the image according to the present disclosure may be realized by a single device without limitation to the display system 100 including a plurality of devices.

Figure 15:
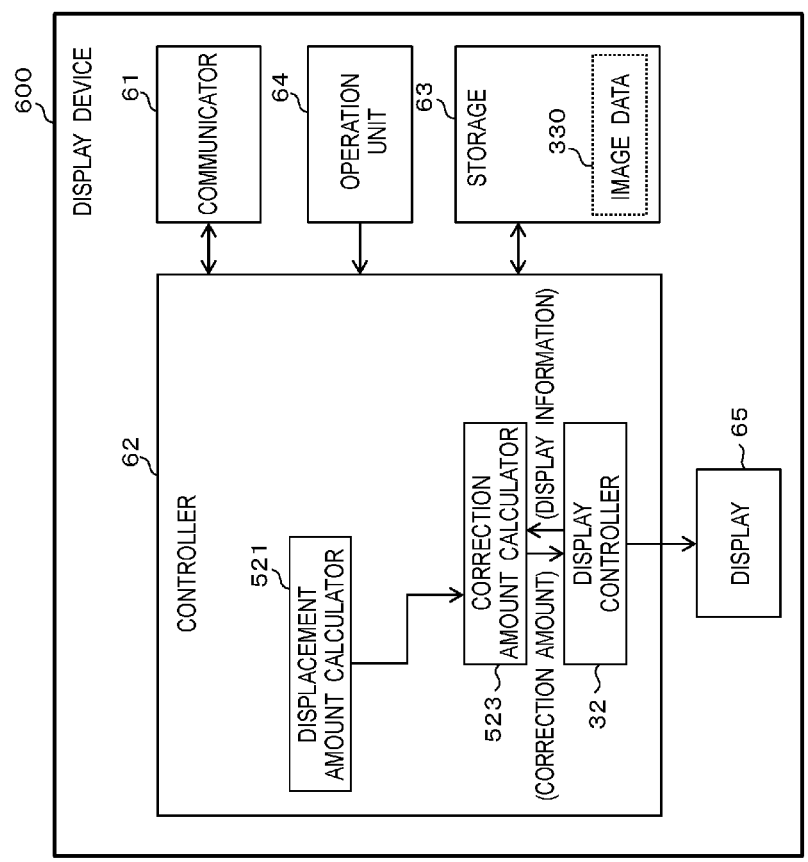
FIG. 15 is a block diagram showing a configuration of a display device in a fifth embodiment.

FIG. 15 shows a configuration of a display device in a fifth embodiment. A display device 600 of the present embodiment is a device that displays an image according to, for example, the traveling of the vehicle 200. The display device 600 is, for example, various information processing devices such as a personal computer, a tablet terminal, a smartphone, and the like. The display device 600 corresponds to, for example, a device in which the display processing device 30 and the correction processing device 50 of the display system 100 of the first embodiment (FIG. 2) are integrally formed.

The display device 600 includes a communicator 61, a controller 62, a storage 63, an operation unit 64, and a display 65.

The communicator 61 has a function or a structure equivalent to that of the communicator 31 or the communicator 51 of the first embodiment.

The controller 62 has a function or a structure equivalent to that of the display controller 32 and the correction controller 52 of the first embodiment. Specifically, the controller 62 includes a displacement amount calculator 521, a correction amount calculator 523, and the display controller 32. The displacement amount calculator 523, the correction amount calculator 523, and the display controller 32 of the present embodiment correspond to the displacement amount calculator 52a, the correction amount calculator 52b, and the display controller 32 of the first embodiment, respectively. The display controller 32 and the correction amount calculator 523 communicate with each other bidirectionally. The display controller 32 outputs the display information to the correction amount calculator 523. The correction amount calculator 523 outputs the correction amount to the display controller 32.

The storage 63 corresponds to the storage 33 of the first embodiment and stores image data 330.

The operation unit 64 is a user interface for inputting various operations by the user. For example, the operation unit 64 is a touch panel provided on the surface of the display 65. The operation unit 64 may be realized by a keyboard, a button, a switch, or a combination of these, other than the touch panel.

The display 65 is composed of, for example, a liquid crystal display or an organic EL display. The display 65 displays, for example, an image indicated by the image data 330 at the display position indicated by "reference position P0+correction amount C1" designated by the display controller 32.

The display device 600 may be connected to a projector or may be incorporated in a projector. The display 65 may include a function or a structure corresponding to the projection device 10 of the first embodiment.

According to the present embodiment, an effect similar to those of the first to fourth embodiments can be obtained.

Other Embodiments

As described above, the embodiments have been described as an example of the technique disclosed in the present application. However, the technique in the present disclosure is not limited to this, and is also applicable to an embodiment in which a changes, replacements, additions, omissions, and the like are appropriately made. In view of the above, other embodiments will be exemplified below.

The above embodiment illustrates the case where the projection device 10, the information acquisition device 20, the display processing device 30, the posture detection device 40, and the correction processing device 50 are separate devices. However, a plurality of devices may be integrally formed as one device. For example, the display processing device 30 and the correction processing device 50 may be integrally formed as one device. The information acquisition device 20 and the display processing device 30 may be integrally formed as one device. The posture detection device 40 and the correction processing device 50 may be integrally formed as one device. The separately formed devices are connected in a manner communicable with each other by wire or wirelessly. Note that all the projection device 10, the information acquisition device 20, the display processing device 30, the posture detection device 40, and the correction processing device 50 may be formed as one device. In this case, the communicators 31 and 51 may be omitted.

The above embodiment describes the example in which the information acquisition device 20 includes the GPS module 21 and the camera 22. However, the information acquisition device 20 may include a distance sensor that measures a distance and a direction from the vehicle 200 to a surrounding object, and may output distance information indicating the measured distance and direction to the display processing device 30. The information acquisition device 20 may include a vehicle speed sensor that detects the speed of the vehicle 200, or may include a navigation system. The information acquisition device 20 may include one or more of the GPS module 21, the distance sensor, the camera 22, and the like. In this case, the GPS module 21 having a function as the information acquisition device 20, the distance sensor, the camera 22, and the like may be built in one device or individually attached to the vehicle 200.

The above embodiment describes the example in which the posture detection device 40 includes the gyro sensor 41. However, the posture detection device 40 may include an acceleration sensor that detects the acceleration of the vehicle 200, and may output the detected acceleration as the posture variation information. The posture detection device 40 may include a vehicle height sensor that detects the height from the road surface, and may output the detected height as the posture variation information. The posture detection device 40 may include other publicly-known sensors. The posture detection device 40 may include one or more of the gyro sensor 41, the acceleration sensor, the vehicle speed sensor, and the like. In this case, the gyro sensor 41 having the function of the posture detection device 40, the acceleration sensor, the vehicle height sensor, and the like may be built in one device or individually attached to the vehicle 200.

The above embodiment describes the case where the moving body is the vehicle 200 such as an automobile. However, the moving body is not limited to the vehicle 200. The moving body may be a vehicle on which a person rides, and may be, for example, an airplane or a ship. The moving body may be an unmanned moving body that is capable of autonomous driving. The moving body may be one that vibrates instead of one that travels.

The above embodiment describes the case where the image is displayed in front of the moving body. However, the position where the image is displayed is not limited to the front. For example, the image may be displayed in the side direction or in the rear of the moving body.

The first to fifth embodiments describe the examples in which the display system 100 is an HUD system. However, the display system 100 does not need to be an HUD system. The display system 100 may include a liquid crystal display or an organic EL display instead of the projection device 10. Display system 100 may include a screen and a projector.

Summary of Embodiment (1) A display system of the present disclosure includes an information acquisition device that acquires a position of a moving body and information outside the moving body, a display processing device that controls display of an image based on information acquired by the information acquisition device, a posture detection device that detects posture variation of the moving body, and a correction processing device that sets a correction amount of a display position of the image based on posture variation of the moving body. The display processing device and the correction processing device communicate with each other bidirectionally.

In this manner, it is possible to suppress the position displacement of the image with high accuracy.

(2) In the display system of (1), when the image is displayed, the image is displayed based on a reference position and the correction amount, and, when the image is not displayed, a display position of the image is returned to the reference position.

In this manner, it is possible to suppress a detection error of the moving body posture due to noise of the posture detection device, and it is possible to detect the moving body posture with high accuracy.

(3) In the display system of (2), the correction processing device may reset the correction amount to zero when the image is not displayed.

(4) In the display system of (2), the correction processing device may reduce the correction amount by a certain amount when the image is not displayed.

(5) In the display system of (2), when the image is not displayed, the correction processing device may reduce the correction amount by a certain amount in a case where the correction amount is equal to or more than a threshold value, and reset the correction amount to zero in a case where the correction amount is less than the threshold value.

(6) In the display system of (2), the correction amount when the image is displayed may be set based on posture variation of the moving body when the image is displayed and posture variation of the moving body before the image is displayed.

(7) in the display system of (1), the posture detection device may include at least one of a gyro sensor, an acceleration sensor, and a vehicle height sensor.

(8) In the display system of (1), the correction processing device sets the correction amount, based on a displacement amount of a display position of the image due to posture variation of the moving body, when the image is not displayed, sets a reference position based on posture variation of the moving body when the image is not displayed, and, when the image is displayed, sets a display position of the image based on the reference position and the displacement amount.

(9) The display system of the present disclosure may further include a projection device that projects light representing an image.

(10) In the display system of the present disclosure, the moving body may be a vehicle, and the image may be a virtual image displayed in front of a windshield of a vehicle.

The display system and the display device according to all claims of the present disclosure are realized by cooperation with hardware resources, for example, a processor, a memory, and a program, and the like.

The present disclosure can be applied to a display system that controls a display position of an image according to the movement of a moving body.

EXPLANATIONS OF LETTERS OR NUMERALS

10 Projection device
20 Information acquisition device
21 GPS module
22 Camera
30 Display processing device
31 Communicator
32 Display controller
33 Storage
40 Posture detection device
41 Gyro sensor
50 Correction processing device
51 Communicator
52 Correction controller
52a Displacement amount calculator
52b Correction amount calculator
100 Display system

The invention claimed is:

1. A display system comprising:
   an information acquisition device that acquires a position of a moving body and information outside the moving body;
   a display processing device that controls display of an image and outputs display information indicating whether or not the image is being displayed;
   a posture detection device that detects posture variation of the moving body; and
   a correction processing device that sets a correction amount of a display position of the image based on posture variation of the moving body, outputs the correction amount when the display information acquired from the display processing device indicates that the image is being displayed, and reduces size of the correction amount when the display information indicates that the image is not being displayed, wherein
   the display processing device controls a display position of the image based on a position of the moving body, the information outside the moving body, and the correction amount, and, wherein
   the correction processing device calculates the correction amount by subtracting a current displacement amount from a displacement amount when the image is not being displayed.

2. The display system according to claim 1, wherein the correction processing device resets the correction amount to zero when the display information indicates that the image is not being displayed.

3. The display system according to claim 1, wherein the correction processing device reduces size of the correction amount by a certain amount when the display information indicates that the image is not being displayed.

4. The display system according to claim 1, wherein when display information indicates that the image is not being displayed, the correction processing device reduces size of the correction amount by a certain amount in a case where the correction amount is equal to or more than a threshold value, and resets the correction amount to zero in a case where the correction amount is less than the threshold value.

5. The display system according to claim 1, wherein when the display information indicates that the image is being displayed, the correction processing device sets the correction amount based on posture variation of the moving body when the image is displayed and posture variation of the moving body before the image is displayed.

6. The display system according to claim 1, wherein the posture detection device includes at least one of a gyro sensor, an acceleration sensor, and a vehicle height sensor.

7. A display system comprising:
   an information acquisition device that acquires a position of a moving body and information outside the moving body;
   a display processing device that controls display of an image and outputs display information indicating whether or not the image is being displayed;
   a posture detection device that detects posture variation of the moving body; and
   a correction processing device that calculates a displacement amount of a display position of the image due to posture variation of the moving body, and when the display information acquired from the display processing device indicates that the image is not being displayed, sets a reference position obtained by adding a displacement amount when the image is not being displayed based on posture variation of the moving body when the image is not displayed, sets a display position of the image based on the reference position and the displacement amount when the display information indicates the image is being displayed, and outputs position information of the display position, wherein
   the display processing device controls a display position of the image based on a position of the moving body, the information outside the moving body, and the position information.

8. The display system according to claim 1, further comprising a projection device that projects light representing the image.

9. The display system according to claim 1, wherein the moving body is a vehicle, and the image is a virtual image displayed in front of a windshield of a vehicle.

* * * * *